W. D. JAMES.
CHAIN ATTACHMENT FOR ADJUSTABLE STANCHIONS.
APPLICATION FILED JAN. 31, 1910.
1,071,236.  Patented Aug. 26, 1913.
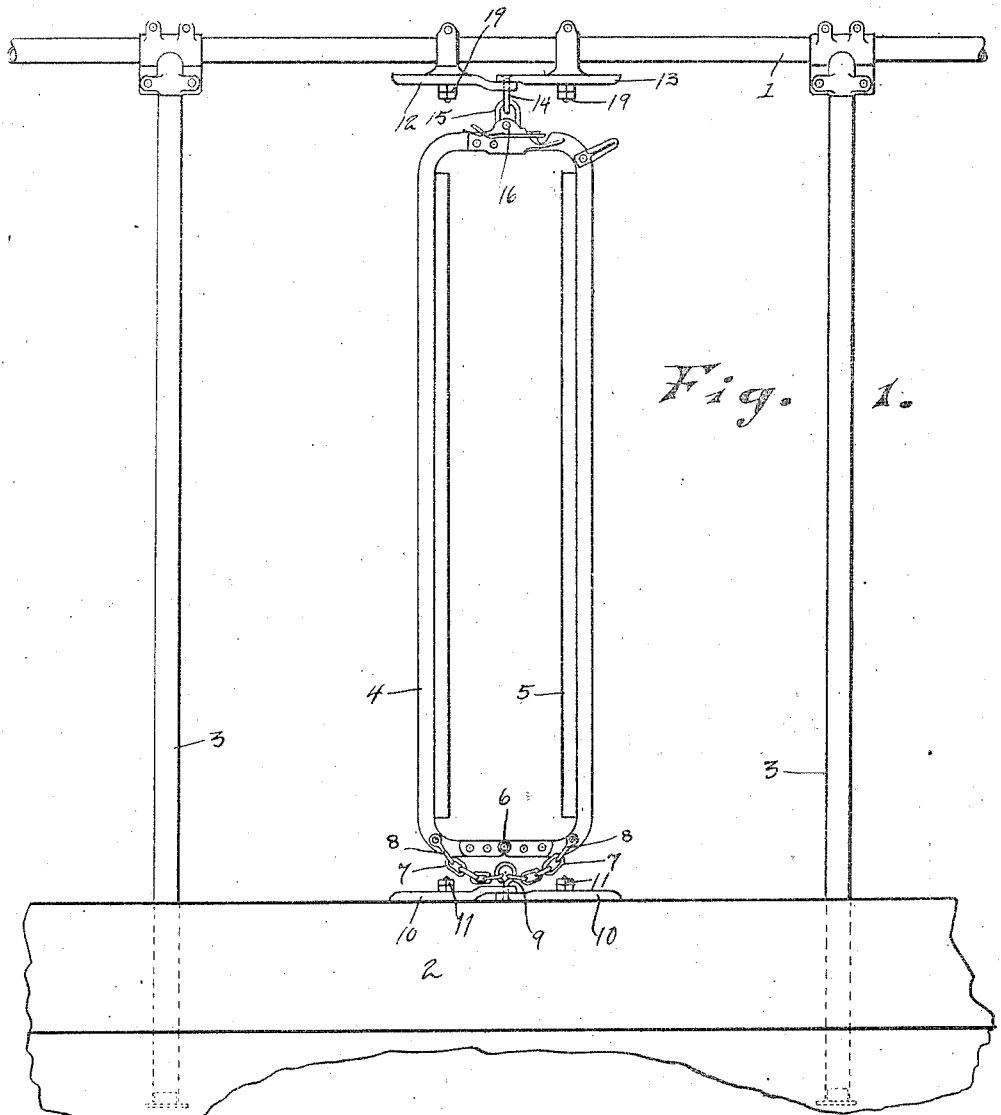
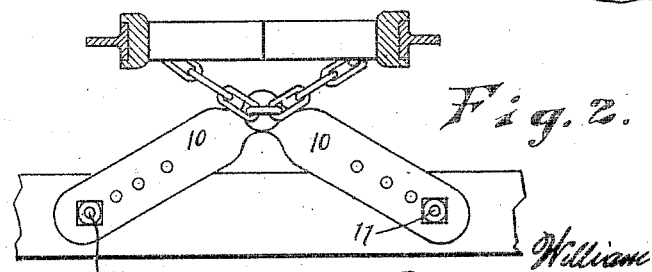

UNITED STATES PATENT OFFICE.

WILLIAM D. JAMES, OF FORT ATKINSON, WISCONSIN.

CHAIN ATTACHMENT FOR ADJUSTABLE STANCHIONS.

1,071,236.

Specification of Letters Patent. Patented Aug. 26, 1913.

Application filed January 31, 1910. Serial No. 540,946.

*To all whom it may concern:*

Be it known that I, WILLIAM D. JAMES, a citizen of the United States, residing at Fort Atkinson, county of Jefferson, and State of Wisconsin, have invented new and useful Improvements in Chain Attachments for Adjustable Stanchions, of which the following is a specification.

My invention relates to improvements in that class of adjustable stanchions, for which Letters Patent of the United States, No. 831871, was issued to myself and David D. James, on the 25th day of September, 1906, and it pertains more especially, among other things, 1st, to the means of connecting the upper and lower ends of the stanchions with the adjustable stanchion supporting links, and 2nd, to the construction and arrangement of the curb with relation to the lower adjustable links and the lower ends of the stanchions.

It will be understood that in order that cattle may be comfortable while lying down, the distance between the stanchions and the floor should not exceed about 12 inches, and for this reason, it has heretofore been common to either dispense with, or cut away the curbing directly beneath the stanchions that the stanchions might have the required movement to properly conform to the movement of the cattle. Experience has, however, proven that when the curb or wall beneath the stanchion is thus cut away or dispensed with, the feed is often thrown out of the manger by the cattle and wasted, and one of the primary objects of my present invention is to so construct the adjustable links and the stanchions that a comparatively high curb may be used beneath the stanchions, which will properly retain the feed in the manger, while the lower end of the stanchions may be brought within the desired distance of the floor, while the chains with which the links are connected with the stanchions will permit of the desired movement of the cattle.

Heretofore, the respective ends of the stanchions have been pivotally connected directly with the adjustable links and the stanchions were therefore retained at a substantially fixed point between the pivotal connections. By my present improvement, however, the flexible connection between the respective ends of the stanchions and the adjustable links, permits the stanchions to be freely moved by the movement of the animal, and the stanchions are not only more comfortable for the animal, but the feed is less liable to become wasted.

The construction of my invention is explained by reference to the accompanying drawings, in which—

Figure 1 represents a front view thereof, and Fig. 2 is a top view, part in section, showing the device for connecting the stanchions with the adjustable links.

Like parts are identified by the same reference numerals in both views.

The stanchion supporting frame comprises the upper horizontal member 1, curb 2, which is preferably formed of concrete, and a plurality of intermediate vertical members 3, which members 1 and 3 are preferably formed of metal.

4 represents the stationary member of a pair of stanchions, and 5 the inclinable member, and the members 4 and 5 are pivotally connected together at their lower ends by the bolt 6 in the ordinary manner, and the respective sides 4 and 5 of the stanchions are connected with the curb 2 by the chains 7, 7, clevises 8, 8, pivotal bolt 9, adjustable links 10, 10, and bolts 11, 11, while the upper ends of said stanchions are connected with the adjustable links 12 and 13 by the pivotal bolt 14, chain 15, and bolts 16, whereby it is obvious that both the upper and lower ends of said stanchions are not only free to be turned on their longitudinal axis around their pivotal supporting bolts 9 and 14, but they are also supported at their upper and lower ends by chains in such a manner that they are free to conform to the movement of the cattle secured in place by such stanchions. The links 10, 10, 12 and 13 are adjustably connected with the respective upper and lower members 1 and 2 by the bolts 11, 11, and 19, 19, substantially as shown and described in said patent, while the opposite ends of said links are respectively connected together by said pivotal bolts 9 and 14.

I am aware that stanchions have heretofore been connected with a supporting frame by a pair of adjustable members or so called links without the use of intermediate chains, also that stanchions have heretofore been connected to supporting frames through chains without the use of intermediate adjustable members or links. Experience has, however proven, that to accomplish the desired object, it becomes necessary to use both the chains and adjustable members, as shown in the accompanying drawings.

Having thus described my invention, what I claim as new, and desire to secure by Letters Patent, is—

1. The combination of a pair of stanchions, a chain connected at its respective ends to the respective sides of said stanchions, a stanchion supporting frame located below said stanchions, and means for adjustably connecting the center of said chain to said frame member.

2. The combination of a pair of stanchions, a chain connected at its respective ends to the respective sides of said stanchions, a stanchion supporting frame member located below said stanchions, a pair of links pivotally connected together at one end, means for adjustably connecting said links at their opposite ends to said frame member, and means for connecting the pivoted ends of said links with the center of said chain.

3. The combination of a pair of stanchions, a chain connected at its respective ends to the respective sides of said stanchions, a stanchion supporting frame member located below said stanchions, a pair of links pivotally connected together at one end, means for adjustably connecting said links at their opposite ends to said frame member, means for connecting the pivoted ends of said links with the center of said chain, and means for pivotally connecting the upper ends of said stanchions with the upper frame member, all substantially as and for the purpose specified.

In testimony whereof I affix my signature in the presence of two witnesses.

WILLIAM D. JAMES.

Witnesses:
W. EICKMANN,
C. O. CHRIST.